Oct. 4, 1927.
M. B. LLOYD
1,644,195
METHOD OF PRODUCING WOODEN ARTICLES
Filed Jan. 11, 1923
3 Sheets-Sheet 1
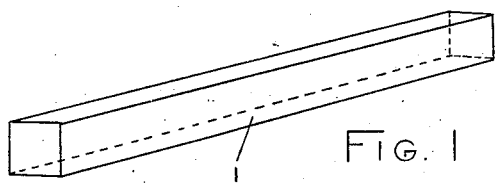
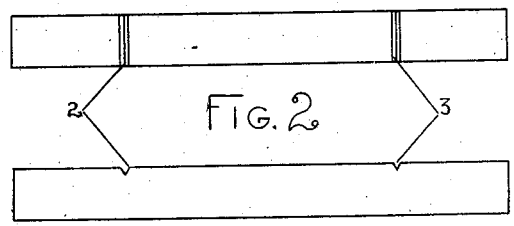
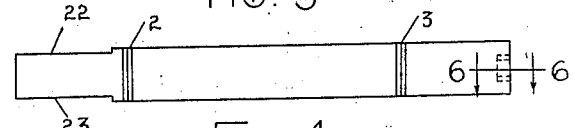
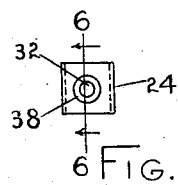 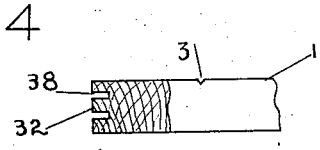
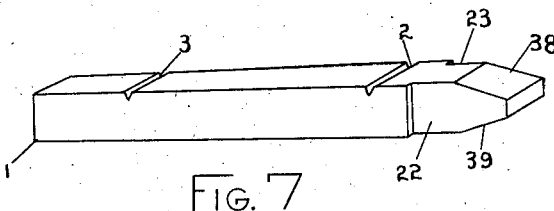
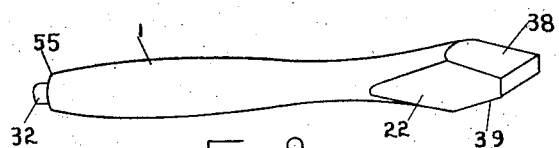
WITNESS
Mary Brennan
INVENTOR.
Marshall B. Lloyd
BY
ATTORNEY.

Oct. 4, 1927.　　　　　　　　　　　　　　　　　　　　　1,644,195
M. B. LLOYD
METHOD OF PRODUCING WOODEN ARTICLES
Filed Jan. 11, 1923　　　3 Sheets-Sheet 2

WITNESS:
Mary Brennan

INVENTOR.
Marshall B. Lloyd
BY
ATTORNEY.

Oct. 4, 1927.                                                    1,644,195
                         M. B. LLOYD
                METHOD OF PRODUCING WOODEN ARTICLES
                     Filed Jan. 11, 1923        3 Sheets-Sheet 3
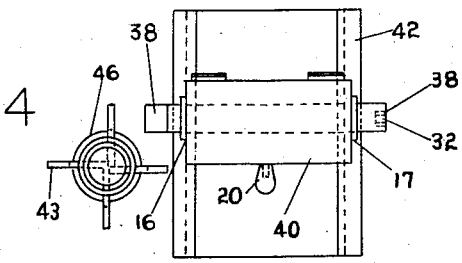
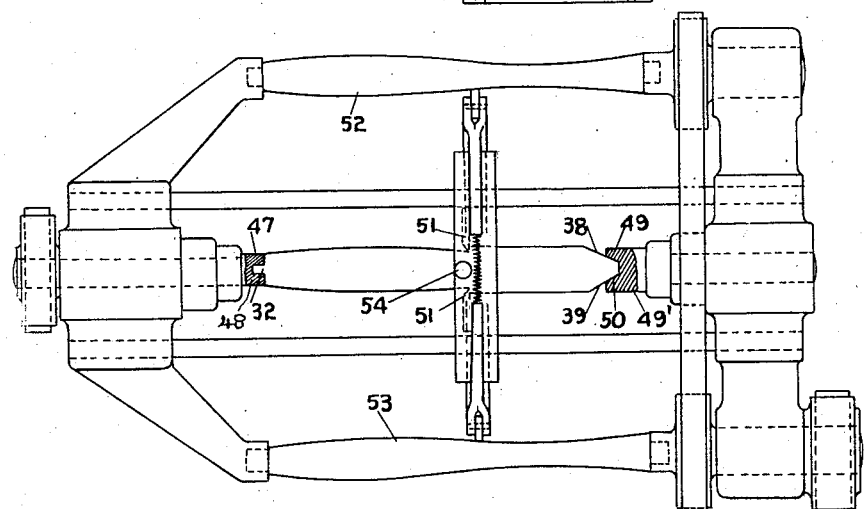
WITNESS:                                          INVENTOR.
Mary Brennan                               Marshall B. Lloyd
                                        BY
                                                    ATTORNEY.

Patented Oct. 4, 1927.

1,644,195

UNITED STATES PATENT OFFICE.

MARSHALL B. LLOYD, OF MENOMINEE, MICHIGAN.

METHOD OF PRODUCING WOODEN ARTICLES.

Application filed January 11, 1923. Serial No. 612,089.

My invention relates generally to methods of producing wooden articles, but relates more particularly to methods of producing shaped wooden articles.

The general object of my invention is to provide a method of shaping wooden articles more rapidly and at lower cost.

I aim also to provide a method of producing wooden articles whereby the number of improperly shaped articles, and hence wastage, shall be reduced to a minimum.

Another object of my invention is to provide a method wherewith it shall be possible to shape wooden articles with greater uniformity.

It is also an object of my invention to provide a method of shaping wooden articles whereby certain of the preliminary steps shall serve to condition the article for better treatment and handling in the finishing steps.

My invention consists generally in the steps, acts, and stated sequence thereof whereby the above named objects, together with others that will appear hereinafter, are obtainable; and my invention will be more readily understood by reference to the accompanying drawings which illustrate the method, as well as apparatus that is adapted to the practice thereof.

In said drawings:

Fig. 1 is a perspective view of a piece of wood to be shaped.

Fig. 2 is a plan view of the piece after it has passed through one of the steps of the method.

Fig. 3 is a side elevation of the piece shown in Fig. 2.

Fig. 4 is a top plan view of the piece after certain further steps have been performed.

Fig. 5 is a view of the right hand end of the piece shown in Fig. 4.

Fig. 6 is a detail sectional view substantially along the line 6—6 of Figs. 4 and 5.

Fig. 7 is a perspective view of the piece after it has passed through a further step in the method.

Fig. 8 is a perspective view of the finished article.

Fig. 14 is a top plan view of the mechanism shown in Fig. 13; and

Fig. 15 is a view of an irregular turning or shaping lathe for the purpose of converting the piece from the shape shown in Fig. 7 to that shown in Fig. 8.

Figure 9:
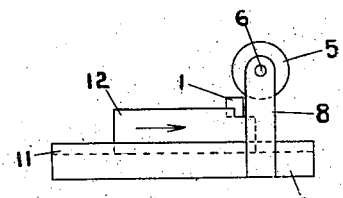
Fig. 9 is a side view of the mechanism for transforming the article from the condition shown in Fig. 1 to that shown in Figs. 2 and 3.

My invention may be utilized for the production of a variety of different articles but for the sake of convenience of illustration, I shall describe it with respect to the manufacture of a wooden vehicle wheel spoke. This should be considered, therefore, as by way of illustration and not by way of limitation except where so limited in the hereunto appended claims.

In the manufacture of wooden spokes under the practice heretofore prevailing it has been customary to turn the body portion of the spoke first and thereafter to shape the butt portion and to provide the tongue-like extension, tenon, or reduced portion at the opposite end, i. e. the portion, when the spokes are assembled in the wheel, that projects into the felly or felly band of the wheel. Under such practice the completed spokes vary considerably in the size and configuration. Furthermore, under such practice it is difficult properly to hold and position the pieces for the performance of various shaping operations, many of which are such as to apply great forces to the spoke tending to displace or remove the same from the proper placed position. The irregularities in the butt portion of the spoke and in the tongue-like, tenon, or reduced end portion resulting from the difficulty of properly holding the spokes during the shaping operations causes the rejection of many of the spokes and also necessitates further finishing operations in an attempt to correct the defects thereof. When such defective spokes are assembled to form the wheel they project or radiate at improper angles and tend to provide or result in an irregular or untrue wheel.

I have devised a method which results in greatly simplifying and expediting the various operations and wherewith spokes of remarkable uniformity result.

Referring now to the drawings I shall describe the various steps of the method in some detail and shall also describe the apparatus wherewith the method can be practiced. Therein 1 represents a piece of wood from which the spoke is to be formed. The piece 1 as here shown is of substantially square cross section and is of elongated form. The sizes thereof will obviously vary in accordance with the size and character of the spoke to be produced. The particular spoke under consideration is one that is especially suitable for the spokes of childrens' vehicles. The general principles involved in the production, however, can be applied to the manufacture of spokes for automobiles and other vehicles. The piece 1 is cut preferably to the exact length required altho some variation in the length is permissible without effecting the proper functioning of the spoke inasmuch as any slight increase in length merely permits the reduced end portion to extend farther into the felly of the wheel. The cross sectional size of the piece 1 is preferably slightly greater than the cross sectional size of the spoke at its largest dimension so that from each spoke there will be removed material to bring them to uniformity of size.

Figure 10:
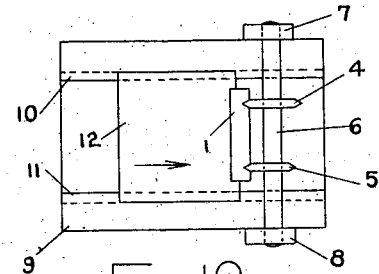
Fig. 10 is a top plan view of the mechanism shown in Fig. 9.

As before stated, the shaping operations tend to displace the spoke or piece during the shaping operations. In order to counteract this tendency and also to provide means whereby the successive shaping operations can be accurately performed one relative to the other, I prefer to provide the piece with what may be termed a guiding portion or portions. This guiding portion or portions may be placed at various positions on the piece and it may assume different shapes and other characteristics. As here shown these guiding portions are two in number and bear the reference characters 2 and 3. They are spaced inwardly from the end of the piece and are in the shape of V grooves. These V grooves may be formed in various ways but one simple method of forming them is shown in Figs. 9 and 10, wherein two V-shaped wheels 4 and 5 respectively are mounted upon a shaft 6 which shaft is mounted for rotation in suitable bearings 7 and 8 that upstand from a base plate 9. Mounted for sliding movement in ways 10 and 11 of the base plate 9 is a holder 12 which is adapted to receive the piece 1. The piece 1 having been placed in the holder, the holder is moved in the direction of the arrows thus causing the piece to pass under the V-shaped wheels 4 and 5 and thereby form the V-shaped grooves 2 and 3 in the piece 1. The mechanism shown in Figs. 9 and 10 is more or less diagrammatic in character but is sufficient to illustrate suitable mechanism. For most practical purposes power means would be provided for pushing the piece under the cutting or groove forming wheels 4 and 5. The wheels are so set relative to the piece that a predetermined amount of material will remain between the bottom of the groove and the bottom of the piece. Obviously this distance will be the same in all of the pieces that are passed through the apparatus of Figures 9 and 10, irrespective of variations in the cross sectional size thereof. This eliminates the necessity of making the pieces 1 extremely accurate in size before they are presented for shaping purposes and thus results in reducing the cost of production.

Figure 11:
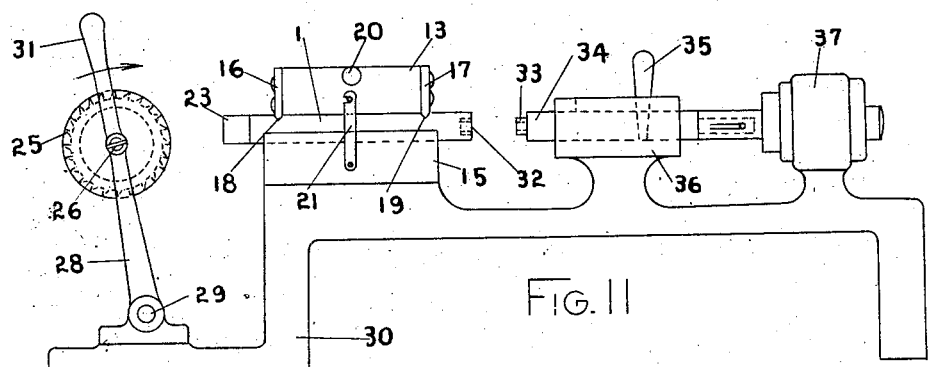
Fig. 11 is an end view of the mechanism adapted to transform the article from the condition shown in Figs. 2 and 3 to that depicted in Figs. 4, 5 and 6.
Figure 12:
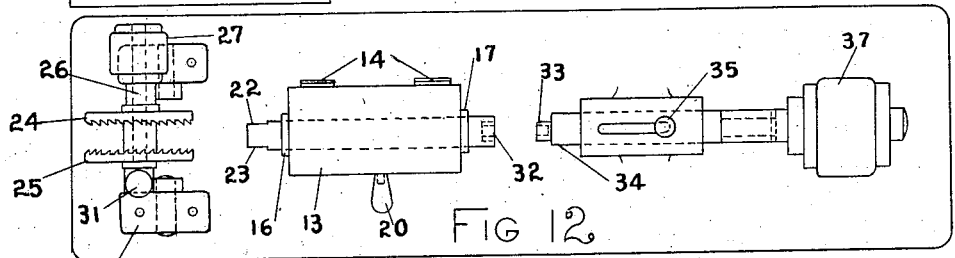
Fig. 12 is a top plan view of the mechanism shown in Fig. 11.

The next operation as here shown is that of facing up two sides of the butt portion of the spoke and providing the reduced tongue like portion at the opposite end, such steps being illustrated in Figs. 4, 5 and 6 of the drawings. The mechanism shown in Figs. 11 and 12 is utilized for this purpose. Therein 13 is a block mounted on hinges 14 of a pillow block 15 whereby it can be swung upwardly from the position shown in Fig. 11 to permit placement of the piece 1 in a recess provided in the pillow block 15 to accommodate the piece. The block 13 is provided with rail-like side bars 16 and 17 respectively, the lower portions 18 and 19 which are V-shaped corresponding to the V-shaped grooves 2 and 3 respectively in the piece 1. A handle 20 is provided for the more convenient manipulation of the block 13 and a latch 21 is provided for locking the block in closed position, in which position the piece is accurately positioned and held firmly against any forces that would tend to displace it. For providing the two faces 22 and 23 that are to form part of the butt of the spoke I have shown two spaced cutters 24 and 25 respectively which are mounted on the armature shaft 26 of a motor 27. The shaft 26 and motor are carried upon lever 28 which is pivoted at 29 to the frame 30 of the machine and at its upper end terminates in a handle portion 31. The cutters 24 and 25 are thereby adapted to be swung inwardly toward piece 1 and being rotated at high speed by the motor 27 quickly and accurately remove the surplus stock and provide the faces 22 and 23 the desired distance apart.

While the piece is held in the block 13 the tongue like portion 32 is provided in the opposite end. This is formed by an annular cutter 33 which is mounted in a slide 34 which slide may be moved toward and from the piece 1 by means of a handle 35. The slide 34, it will be observed, is mounted in a suitable bearing 36 carried by the frame of the machine and the end portion of the cutter 33 is operatively connected to the armature shaft of a motor 37. The connection is such as to permit sliding movement without breaking the operative connection. Thus the cutter 33 is moved toward and into the piece thereby cutting an annular groove 38 therein which results in forming the tongue like portion 32. Obviously, if desired, the faces 22 and 23 can be formed after the portion 32 is formed instead of before as here described, the sequence thereof not being material. If desired, also, and this is the preferable way of doing it, the cutters 24 and 25 may be swung toward the piece while the cutter 33 is moved toward the piece so that both operations are performed simultaneously. This not only saves time but also results in one cutting action tending somewhat to counteract any displacement tendency of the other cutting action. The piece is now removed by releasing the latch 21 and swinging the block 13 upwardly.

Figure 13:
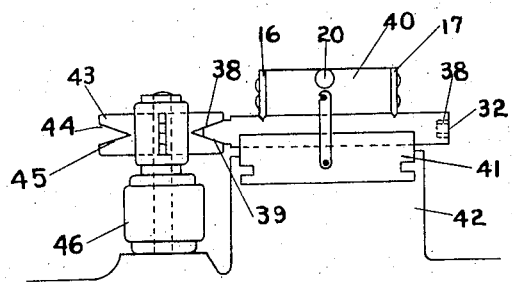
Fig. 13 is an end view of mechanism for use in transforming the article from the condition shown in Figs. 4, 5 and 6 to that shown in Fig. 7.

The next operation is that of forming the bevel faces 38 and 39 in the butt portion of the spoke. To this end, the piece is placed in a block 40 which block or holder is similar to the block 13 except that it is mounted on a slidable base 41 which is mounted for sliding movement and properly guided in a base plate or frame 42. For cutting the bevel faces a rotary cutter 43 is provided having V-shaped cutting faces 44 and 45 which are adapted to provide the bevel faces 38 and 39 of the butt portion of the spoke. The cutter 43 is mounted on the armature shaft of the motor 46 by which it is rotated at high speed. It will be understood that the piece 1 while held in the blocks 40 and 41, is moved past the rotating cutter 43 and that the material is quickly and easily removed. When the block or piece is removed from the mechanism shown in Figs. 13 and 14 it appears as in Fig. 7 and is ready for the final shaping operation. That is to say it is ready for the shaping of the irregular body portion of the spoke.

The shaping of the body portion of the spoke may be accomplished by means of any well known irregular shaping or turning lathe so that no detailed description thereof is thought necessary. In Figure 15 however I have illustrated in a general way apparatus for turning the irregular body portion inasmuch as I have shaped the end portions of the article in a manner especially adapted to co-act with holding members or chucks of the turning lathe. Thus in Fig. 15 the spindle of the irregular turning lathe is provided with one chuck or end portion 47 which has a recess 48 therein of a shape adapted to receive the tongue like portion or tenon 32. The other chuck or end portion 49' is provided with a recess having V-shaped sides 49 and 50 adapted to conform to bevel faces 38 and 39 of the spoke. Opposite faces of the recess in the chuck or receiving portion 47 are parallel to conform to the parallel faces 22 and 23 of the butt portion of the spoke. It will, therefore, be observed that the spoke is very firmly held in place and that the irregular shaping operation can be performed without danger of disturbing or displacing the same. As before stated, it is not thought necessary to describe in detail the irregular shaping or turning lathe. It will be understood that the spindle is located and that the cutter 51 is moved to and from the piece 1 under the action or guidance of the templets 52 and 53. The cutter is moved longitudinally of the piece by means of a handle 54 so that the entire body portion of the spoke may be formed.

It should be noted that the material surrounding the tongue-like reduced portion or tenon 32 is in place until after the cutting action is started in the lathe so that this surplus material can be removed without danger of splintering the edge portion i. e. that portion marked 55 in Fig. 8.

Those who are skilled in the art to which this invention appertains will understand, without further comment, the many advantages which my method of procedure offers over those methods which have heretofore been devised and which are now in general use. It may also be stated that the practice of my process has demonstrated its great utility.

I claim:

1. The method of producing vehicle wheel spokes that consists in providing a spoke blank, in forming an annular groove in one end of the blank to define a tenon within said end, in forming the other end of the blank to provide the butt end of the spoke, and then shaping the body of said spoke from between said ends and during the shaping, removing the material from the first mentioned end of the blank to expose the tenon.

2. The method of producing vehicle wheel spokes that consists in providing a spoke blank of substantially the overall length of the finished spoke, in forming an annular groove in one end of the blank to define a tenon within said end, in forming oppositely disposed flat faces upon the other end of the blank and also in forming oppositely disposed tapered surfaces on said other end in a plane extending at a right angle thereto and in then shaping the body of the spoke from between said ends, and during said shaping removing the material from the first mentioned end of the blank to expose said tenon.

In testimony whereof, I have hereunto set my hand, this 5th day of January, 1923.

MARSHALL B. LLOYD.